Figure 1:
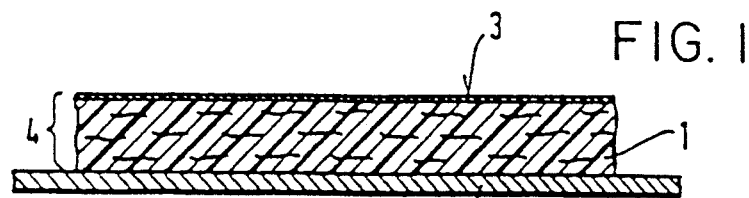

United States Patent [19]
Schorm et al.

[11] Patent Number: 5,341,561
[45] Date of Patent: Aug. 30, 1994

[54] PROCESS FOR PRODUCING THE ELECTRIC INSULATION OF ELECTRIC MACHINE WINDINGS

[75] Inventors: Josef Schorm; Otakar Zych, both of Prague, Czechoslovakia; Gottfried Deutschmann, Leibnitz, Austria

[73] Assignees: Isovolta Osterreichische Isolierstoffwerke Aktiengesellschaft, Austria; CKD Trakce A.S., Czechoslovakia

[21] Appl. No.: 838,224

[22] PCT Filed: Jul. 3, 1991

[86] PCT No.: PCT/AT91/00083

§ 371 Date: Apr. 8, 1992

§ 102(e) Date: Apr. 8, 1992

[87] PCT Pub. No.: WO92/01328

PCT Pub. Date: Jan. 23, 1992

[30] Foreign Application Priority Data

Jul. 3, 1990 [CS] Czechoslovakia ............. PV 3326-90

[51] Int. Cl.$^5$ ............................................. H02K 15/06
[52] U.S. Cl. ......................................... 29/596; 29/598; 29/606; 310/43; 310/215
[58] Field of Search ..................... 29/596, 598, 606; 310/214, 215, 42, 43

[56] References Cited

U.S. PATENT DOCUMENTS

| | | | |
|---|---|---|---|
| 4,037,312 | 7/1977 | Deis | 29/598 |
| 4,484,024 | 11/1984 | Bentley, Jr. | 174/121 |
| 4,643,940 | 2/1987 | Shaw et al. | 428/308 |

FOREIGN PATENT DOCUMENTS

| | | |
|---|---|---|
| 2905965 | 8/1980 | Fed. Rep. of Germany ...... 310/214 |
| 3319373A1 | 11/1984 | Fed. Rep. of Germany . |
| WO91/04854 | 4/1991 | PCT Int'l Appl. ........... B32B 27/04 |
| WO91/12133 | 8/1991 | PCT Int'l Appl. ........... B32B 27/04 |
| 378173 | 8/1932 | United Kingdom . |
| 1504106 | 3/1978 | United Kingdom . |

*Primary Examiner*—Carl E. Hall
*Attorney, Agent, or Firm*—Bacon & Thomas

[57] ABSTRACT

In order to produce the electric insulation of the winding of an electric machine, grooves having a cross-section that tapers at least in an area near to the groove opening are arranged in the rotor or motor. Before the winding is laid in the grooves, the latter are lined with a laminate that contains an elastically compressed mass of high-elastic, electrically insulating fibres and a solidified, curable synthetic resin that can still be thermally softened, however, and that holds the mass of fibres in its compressed state. Once the winding is laid and the grooves are closed, the rotor or stator is subjected to a vacuum pressure impregnation, then cured. During the impregnation process, the hot saturating resin penetrates into the pores of the elastically expandable laminate, elastically expanding the mass of fibres and filling the empty spaces in the grooves, so that the elastically expanded mass of fibres, that is supported at the surface of the groove, exerts on the upper subconductor bundle of the winding a force in the direction of the bottom of the grooves.

19 Claims, 4 Drawing Sheets

PROCESS FOR PRODUCING THE ELECTRIC INSULATION OF ELECTRIC MACHINE WINDINGS

TECHNICAL DOMAIN

The invention relates to a process for manufacturing the electrical insulation of the winding of an electrical machine which has winding sections, particularly subconductor bundles, which are placed with play in the grooves of the rotor or stator.

STATE OF THE ART

The quality of the electrical insulation of the windings of electrical machines, i.e., motors and generators, can be impaired to a considerable degree by the occurrence of air gaps between the individual layers of the insulating, and in particular, by air gaps between the outer insulating layers of the winding and the inner walls of the grooves in the laminate housing of the rotor or stator of the machine in which the winding is placed. Such air gaps have a detrimental effect on the discharge of the Joule heat occurring in the winding during operation into the laminate housing.

Air inclusions and air gaps inside the insulation itself can be largely prevented by other known technologies. However, this applies only to a limited degree to the prevention of air gaps between the outermost layer of the insulation and the inner walls of the groove. For manufacturing reasons, it is generally not possible to make both side walls of the groove in the laminate housing fully uniform and plane-parallel. Even if a subconductor bundle to be placed in the groove had a perfected prismatic cross-section, it would only be possible to place it in the groove with a more or less large degree of play between the surface of the insulated subconductor bundle and the two side walls of the groove.

According to the so-called "resin-rich" process for the manufacture of insulation of windings of electrical machines, a technique is known in which the insulation is composed of insulating materials which have such a high content of binders in the form of thermosetting synthetic resin that because the synthetic resin becomes fluid during manufacturing, air inclusions can be avoided. In this process, following the application of the insulating materials, the winding is heat-treated in an expansive device and brought into a pressing process involving hardening of the synthetic resins contained in the insulation down to a precisely predetermined size, which makes it possible to achieve a relatively low degree of play between the winding and the inner walls of the groove.

According to another process, referred to as the vacuum pressure impregnation process, the insulation of the winding consists at least to a large extent of absorbent, porous insulating materials. After placement of the winding in the grooves, however, there is initially a larger play between the winding and the inner walls of the groove. The rotor or stator having the winding is then impregnated with a thermosetting impregnating resin in a vessel. In this process, in an initial step, the rotor or stator is placed under a vacuum in the impregnation vessel, which removes the air from the pores and/or gaps, after which it is placed in the impregnation resin bath. The subsequent production of excessive pressure in the impregnation vessel makes penetration of the impregnation resin into the pores and gaps easier. In subsequent heat treatment under elevated temperature, the impregnation resin absorbed by the rotor or stator and the binders and synthetic resins in the insulation are hardened.

However, experience shows that in the case of conventional vacuum pressure impregnation processes as well, the occurrence of air gaps between the subconductor insulation and the inner walls of the groove cannot be reliably prevented.

In order to remedy this, the applicant of the older international patent application, PCT/AT91/00021, suggested that, for the manufacture of the electrical insulation of the winding of an electrical machine according to the vacuum pressure impregnation process, the grooves be fitted with a laminate prior to laying the winding into the grooves of the stator or rotor, which laminate would contain at least one laminate layer made of an elastically compressed, highly elastic, electrically insulated fiber material and a solidified, curable synthetic resin, which can, however, be thermally softened and which holds fiber material in its compressed state. Once the winding is laid and the grooves are closed, the rotor or stator is subjected to vacuum pressure impregnation and subsequently hardened in an oven. During the impregnation process, the hot impregnating resin also penetrates the pores of the elastically expandable laminate in particular. This causes the synthetic resin to melt, in turn causing the fiber material to expand elastically, thus evenly filling the gaps in the groove so that air inclusions in the groove are reliably prevented.

DESCRIPTION OF THE INVENTION

The purpose of the Invention is to alter the process of manufacturing the insulation of the winding of an electrical machine as described in the cited international patent application in such a way that better mechanical fixation of the windings in the grooves is obtained.

The purpose of the Invention is achieved by the process according to the invention, which is characterized in that grooves are provided whose cross-section, at least in the area of the groove depth in which the groove opening is approached, tapers in a radial direction towards the groove opening and that—at least in this area—a laminate which expands under heating is inserted into the gap-shaped space which forms between the groove surface and the winding sections or subconductor bundles, this laminate containing an elastically compressible, highly elastic fiber material as well as a solidified, curable synthetic resin, which can, however, be thermally softened and which maintains the fiber material in its compressed state, and that the laminate is then heated in order to soften the synthetic resin, whereupon the laminate expands because of the released tension on the compressed fibers and fills out the aforementioned gap-shaped space in such a manner that, in the cited area of the tapering groove cross-section, the remaining mechanical compression causes the elastically expanding fiber material, supporting itself on the groove surface, to exert at least on an inserted winding section or a subconductor bundle a considerable component of force in the direction of the bottom of the groove, and that the synthetic resin is subsequently hardened at an increased temperature. In this process, the heating of the synthetic resin is preferably performed by impregnating the laminate with a hot, liquid, thermosetting material as an impregnating medium, which fills the pores of the expanded laminate.

According to advantageous modes of implementation of the process of the invention, the groove opening is closed by a temporary or permanent nib fixture prior to the expansion of the fiber material in the laminate used. In this case, a winding made from a temperature-contracting tape which is removably attached to the rotor surface can be used as a nib fixture to temporarily close the groove openings of a rotor, or a preferably removable, divisible, cylindrical template can be used as a nib fixture to temporarily close the groove openings of a stator. In advantageous modes of implementation of the process of the invention, breech wedges or backplates which are secured in lateral mounting grooves designed into the side walls of the groove can be used as permanent nib fixtures to close the groove openings.

In a further advantageous mode of implementation of the process of the invention, the area in which the groove cross-section tapers towards the groove opening is at or near the groove opening, with its depth being less than half of the groove depth and the upper edge of the winding section or subconductor bundle which is laid in the groove and is closest to the groove opening lying within this area.

In further advantageous modes of implementation of the process of the invention, the laminate used has a film of electrically insulating material on one or both sides which border the elastically expanding layer, with the laminate being laid into the gap-shaped space with the film side facing the groove wall or the laminate laid in having a film of electrically insulating material on both sides. In the laminate used, at least one of the films can advantageously consist of polyester or polyimide, while the elastically expandable layer of the fiber material should preferably consist of glass fibers, aramide fibers or polyester fibers.

In another advantageous mode of implementation of the invention, the fiber material in the elastically expandable layer of the laminate is manufactured on the basis of fiber fleece, glass fiber mats, or fiber felts. In a final advantageous mode of implementation of the process of the invention, the elastically expandable layer of the laminate has a synthetic resin content of 10 to 40% by weight, and preferably a synthetic resin content of 10 to 28% by weight.

Several Modes of Implementation of the Invention Explained by Means of Figures

In implementing the process according to the invention, a laminate is required which is manufactured in the following manner according to an example of the process.

A strip of glass fiber fleece with a specific weight of 60 g/m$^2$ and a thickness of 1.0 mm manufactured from cut, non-oriented, alkaline-free glass filaments is impregnated with a resin which consists of 98.4% of an epoxy resin based on a diglycidyl ether of bisphenol A and of 1.6% of zinc naphthenate in such a way that the resin content of the impregnated strip of glass fiber fleece is 20% by weight. The addition of the zinc naphthenate has the advantageous effect on the remainder of the process of lowering the Kofler melting range of the epoxy resin used, which would otherwise be approximately 120° C., so that the impregnation resin itself has a melting range of about 70° C.

Impregnation takes place in an impregnation apparatus in which the continuously fed-in strip of glass fiber fleece is subjected to dripping of a solution of the impregnating resin in methylethylketone as a solvent, and the solution is then evaporated while passing through a drying duct. The strip of glass fiber fleece impregnated in this manner is then cut into pieces of defined length and stacked in the usual manner.

Figure 2:
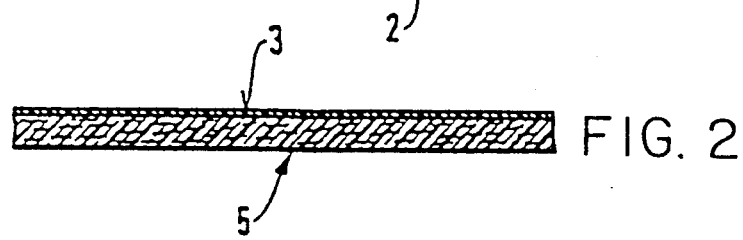

As schematically shown in FIG. 1, in order to manufacture the laminate, the impregnated glass fiber fleece 1 is placed on the press metal support 2 and covered with a polyester film 3 (polyethylene terephthalate) with a thickness of 0.03 mm. This stack, which has a thickness of 1.05 mm, is then moved on the press metal support into a press with press plates which can be heated and recooled and is compressed to a thickness of 0.45 mm by moving the press plates against spacer strips. The press plates are then heated to 120° C., and this temperature is maintained for approximately 1 hour. In this process, the pressed material is thoroughly heated, and the impregnating resin is softened due to its low melting range, after which it becomes fluid and is uniformly spread through the volume of the fiber mat. After this, the press plates and the pressed material are cooled down to room temperature, which causes the impregnating resin to solidify again, and the compressed stack 4 is converted into the finished laminate 5—see FIG. 2—which is then discharged from the press.

The manufacturing of the electrical insulating of the winding of an electrical machine and its placement in the groove will now be explained by means of FIG. 3.

Figure 3:
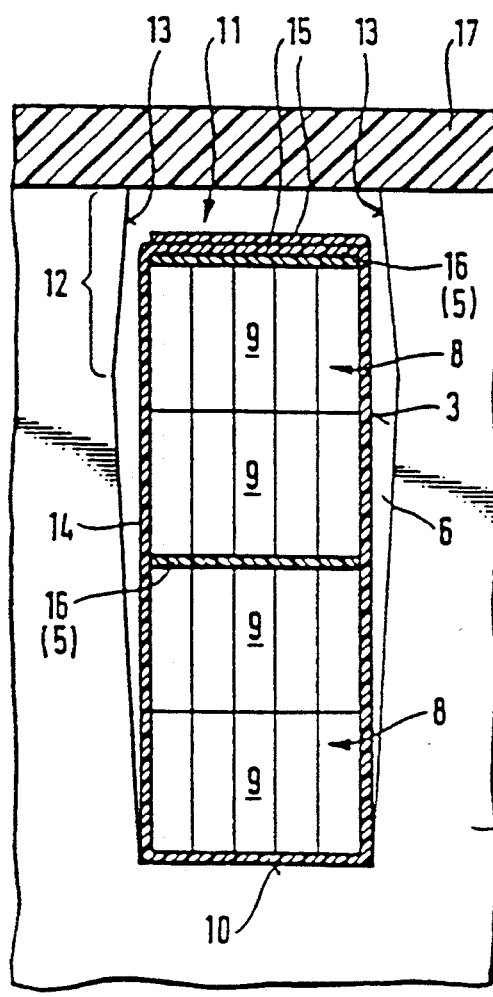

FIG. 3 shows a section through a groove 6 in the laminate housing 7 of the rotor together with the two subconductor bundles 8 shown as sections. Each of the subconductor bundles 8 consists of ten copper conductors 9, whose single-conductor insulation can consist of a mica/plastic film compound which has a relatively high binders content and subconductor bundle insulation having a low binder content, such as mica/glass fibers not shown in the Figure.

The cross-section of the groove 6 exhibits a special shape: starting at the bottom 10 of the groove, the groove cross-section initially expands, after which it again tapers within an area 12 lying next to groove opening 11. Within this area 12, the laterally even sections 13 of the groove surface are each directed inwards at an angle which can advantageously be between 4° and 6°.

A precut and prefolded shell 14 of the described laminate, having the same width as the bottom 10 of the groove, is first placed in each of the still-empty grooves 6, with the cover areas 13 of the shell 14, shown lying above one another in FIG. 3, still unfolded. The expandable laminate 5 of shell 14 is oriented so that its film side faces the groove wall. The winding is then laid in the groove 6, with a strip 16 of the expandable laminate 5 being placed between each of the two subconductor bundles 8 as well as over the upper subconductor bundle. Finally, the two cover areas 15 of the shell 14 are folded over each other and secured by gluing. After the winding has been laid in the grooves as described above, a winding 17 made of a temperature-contracting tape is placed on the rotor surface. FIG. 3 shows the arrangement in this phase of the process.

The rotor is then subjected to conventional vacuum pressure impregnation and subsequently hardened at an increased temperature in an oven.

In the impregnating process, the hot and relatively fluid impregnating resin penetrates all free gaps and pores within the groove and the winding insulating, particularly the pores of the expandable laminate material of the shell 14 and the strip 16. This causes the resin which maintains the fiber material in a compressed state to melt, causing the fiber material to be elastically decontracted, thus filling out the gap-shaped space in the groove and the cavity between the winding 17— which forms a temporary nib fixture—and the upper surface side of the upper subconductor bundle 8 respectively. After the rotor has been hardened in the oven, the winding 17 is removed, and one obtains a configuration like the one shown in the diagram in FIG. 4.

Because of the remaining mechanical compression, the elastically expanding fiber material which supports itself against the sections 13 of the groove surface exerts a considerable force on the uppermost of the two subconductor bundles 3 in the area 12 of the tapering groove cross-section, in the direction shown by the arrow 18, i.e., in the direction of the bottom 10 of the groove. This causes the two subconductor bundles 8 to be maintained under tension in the groove 6, which leads to a significant increase in the stability of the fixation of the winding in the grooves.

Figure 4:
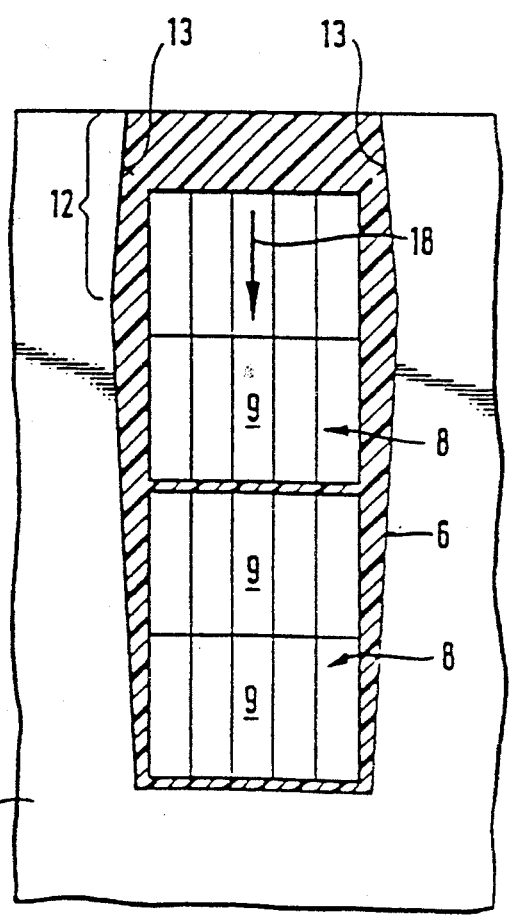

In contrast to the variants of the process of the invention described with reference to FIGS. 3 and 4, where one makes do with a temporary nib fixture in the shape of the winding 17, permanent nib fixtures are used in the process variant of the FIGS. 5 and 6 and of FIG. 7 respectively.

Figure 5:
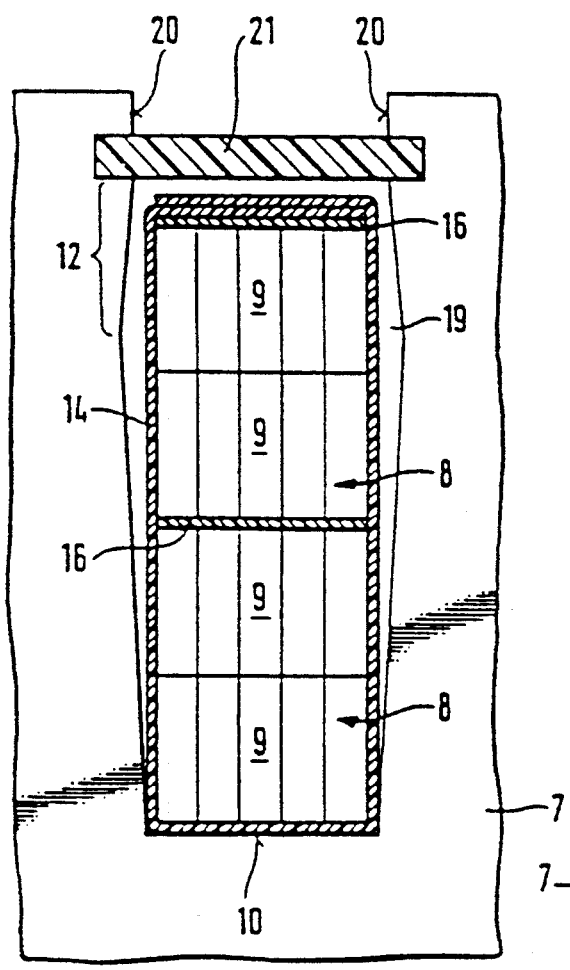
Figure 6:
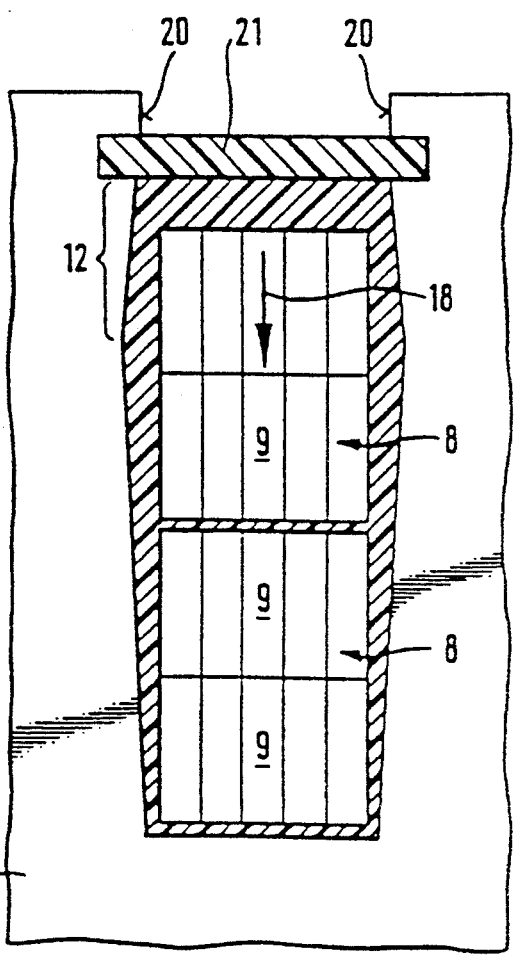

FIG. 5 shows a groove 19 whose cross-section is shaped similarly to the groove 6 of FIG. 3, but in which the tapering cross-section in the area 12 does not reach the groove opening 11; rather, an area 20 with plane-parallel side walls of the groove adjoins it in which mounting grooves lying opposite one another have been designed, which hold a backplate 21. For the remainder, the arrangement of the two subconductor bundles 8 of the shell 14 and the laminate strips 16 is identical to that shown in FIG. 3. FIG. 6 shows the configuration of the arrangement of FIG. 5 after expansion of the elastically compressed fiber material.

Figure 7:
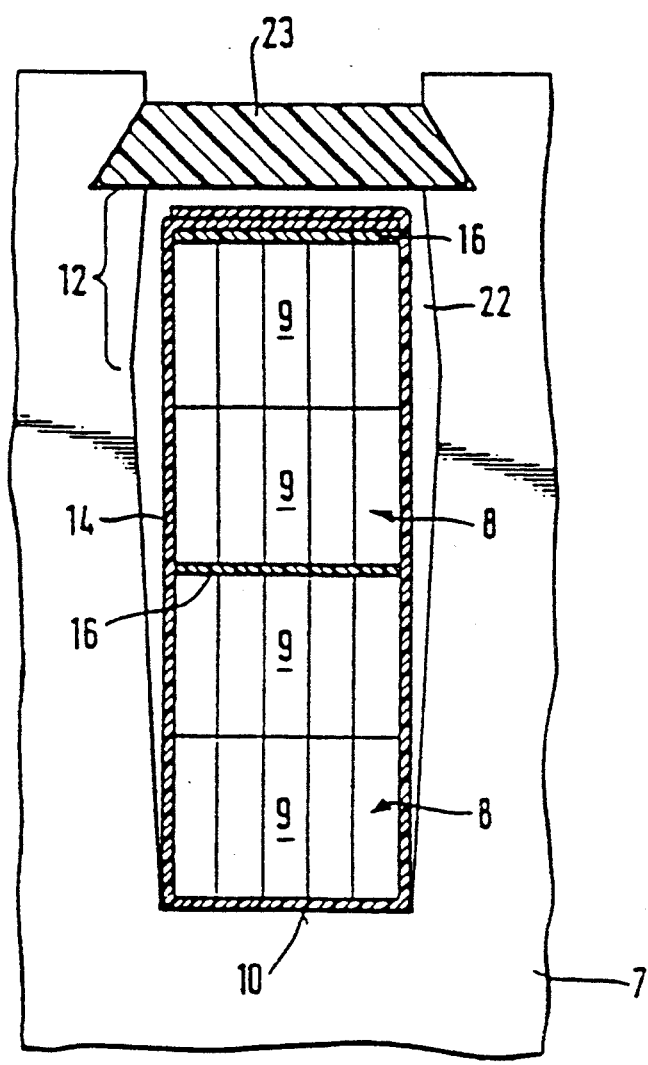

FIG. 7 represents a groove 22 with inserted winding which is identical to the one of FIG. 5, with the difference that a breech lock 23 is attached in place of a backplate.

Figure 9:
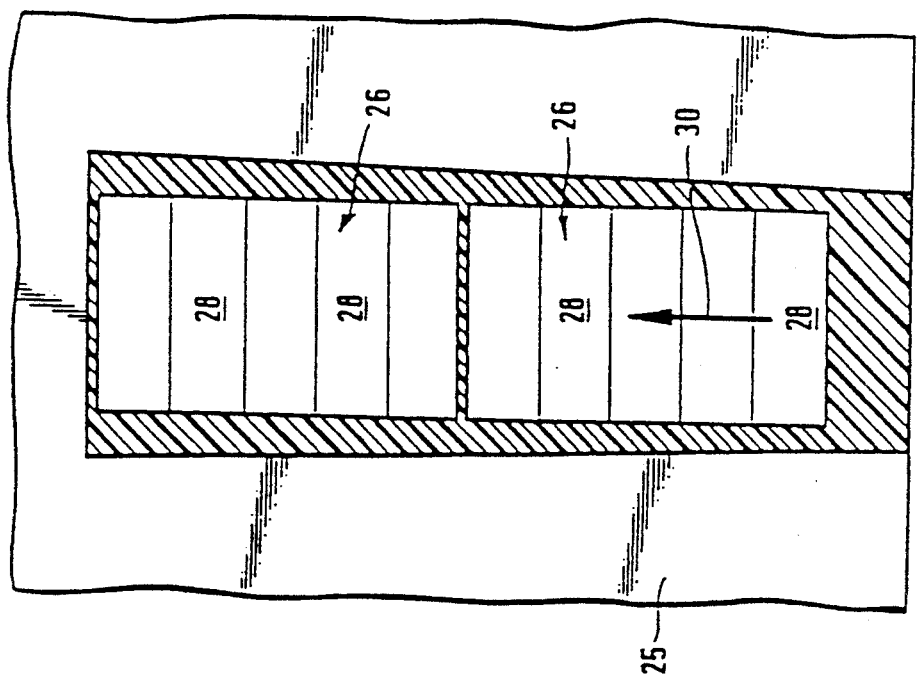
Figure 8:
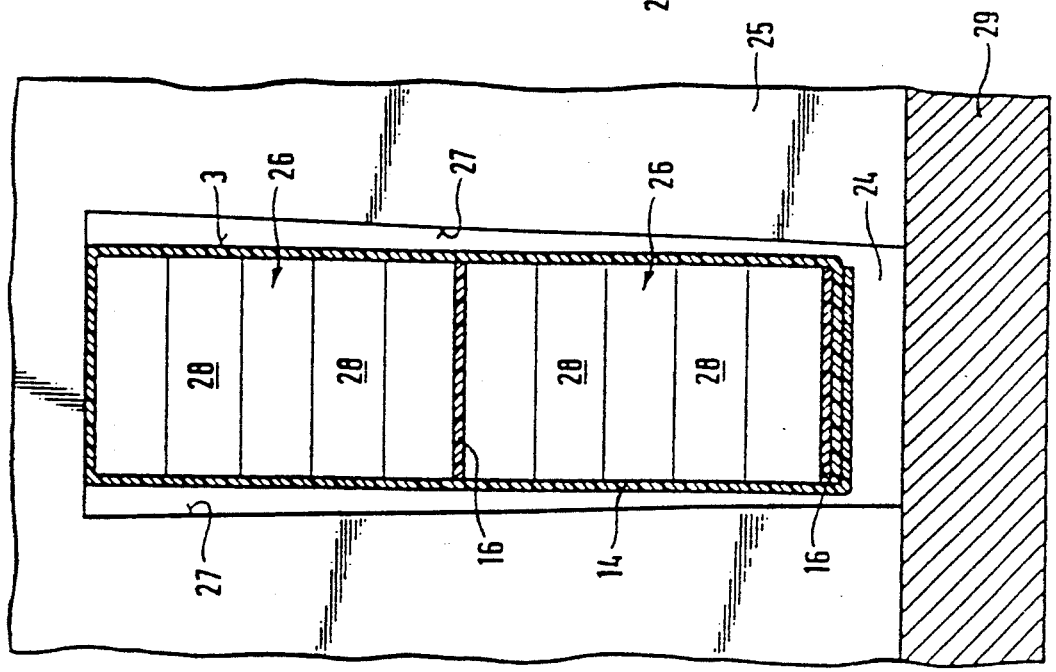

FIGS. 8 and 9 demonstrate the manufacture of the electrical insulation of the stator of an electrical machine as well as its fixation in the grooves 24.

In FIG. 8, the cross-section of a groove 24 in the stator laminate housing 25 with two diagrammatically outlined subconductor bundles 26 is shown. The groove 24 has groove side surfaces 27 which are laterally level and which are directed inwards at an angle of 1.5° each. The two subconductor bundles 26 each have five conductors 28. The arrangement of the shell 14 and the strips 16 is similar to that of the rotor variant of FIGS. 3 and 4. A removable and divisible template, which is indicated on 29 in FIG. 8 and covers all grooves of the stator, serves as a temporary nib fixture. The expansion of the elastically compressed fiber material during vacuum pressure impregnation causes a force to be applied primarily to the subconductor bundle lying at the groove opening and shown by the direction of the arrow 30 (see FIG. 9). After the stator has been hardened in the oven, the template 29 is removed, and one obtains the configuration shown in FIG. 9.

The arrangement of the laminate in the gap between the groove wall and subconductor surface with the film facing the groove wall has the advantage that, when the winding is disassembled, it acts as a so-called separation film.

The laminate used in the process may consist of various layer combinations. In the case of a 2-layer construction, which consists of a film and an elastically expandable layer, for example, a polyester film is used for machines of class F and a polyimide film, or a film combination containing a polyimide film, for machines of class H. The elastically expandable layer should preferably be manufactured from glass fiber fleece, a glass fiber mat, a polyester felt, or an aramide felt (Nomex felt).

Commercial Applicability

The process according to the invention can be particularly advantageous in the manufacture of traction engines and in all machines in which the grooves in the laminate housing of the rotor or stator have a groove coating.

We claim:

1. A process for manufacturing the electrical insulation of the winding of an electric machine, said machine having a rotor and a stator, each of which having radially directed grooves with groove openings, which has winding sections or subconductor bundles placed with play in the grooves of the rotor or stator comprising providing grooves whose cross-section proximate to the groove opening, tapers in a radial direction inwardly towards the groove opening, inserting at least in the area proximate to the groove opening, a laminate which expands under heating into the gap-shaped space which forms between the groove surface and the winding sections, this laminate containing an elastically compressible, highly elastic fiber material as well as a solidified, curable synthetic resin, which can, however, be thermally softened and which maintains the fiber material in its compressed state, heating the laminate in order to soften the synthetic resin, whereupon the laminate expands because of the released tension on the compressed fibers and fills out the aforementioned gap-shaped space such that, in said area of the tapering groove cross-section, the elastically expanding fiber material exerts at least on an inserted winding section or a subconductor bundle a considerable component of force in the direction of the bottom of the groove, and hardening the synthetic resin at an increased temperature.

2. The process of claim 1, wherein heating of the synthetic resin takes place via impregnation of the laminate with a hot liquid thermosetting material as an impregnation medium, which fills up the pores of the expanded laminate.

3. The process of claim 1, wherein prior to the expansion of the fiber material in the laminate used, the groove opening is closed by a temporary or permanent nib fixture.

4. The process of claim 3, further comprising applying a removable winding made of a temperature-contracting tape to the rotor surface to temporarily close the groove openings of the rotor.

5. The process of claim 2, wherein a removable, divisible, cylindrical template serves as a nib fixture to temporarily close the groove openings of a stator.

6. The process of claim 2, further comprising providing breech locks or backplates which are held in lateral mounting grooves in the side walls of the groove as permanent nib fixtures to close the groove openings.

7. The process of claim 1, wherein the area in which the groove cross-section tapers towards the groove opening or lies near the groove opening has a depth which is less than half the groove depth and that the upper edge of the winding section or subconductor bundle lying closest to the groove opening and facing the groove opening is located within this area.

8. The process of claim 1, wherein the laminate has a film of electrically insulating material on at least one side which is adjacent to the elastically expanding layer.

9. The process of claim 8, further comprising placing the laminate with the film side facing the groove wall in the gap-shaped space.

10. The process of claim 8, wherein the laminate has a film of electrically insulating material on both sides adjacent to the elastically expandable layer.

11. The process of claim 1, wherein the laminate has a film of electrically insulating material on both sides adjacent to the electrically expandable layers.

12. The process of claim 8, wherein the laminate contains at least one film consisting of polyester.

13. The process of claim 8, wherein the laminate contains at least one film consisting of polyimide or contains polyimide in a film compound.

14. The process of claim 1, wherein the fiber substance in the elastically expandable layer of the laminate consists at least predominantly of glass fibers.

15. The process of claim 1, wherein the fiber substance in the elastically expandable layer of the laminate consists at least predominantly of aramide fibers.

16. The process of claim 1, wherein the fiber substance in the elastically expandable layer of the laminate consists at least predominantly of polyester fibers.

17. The process of claim 1, wherein in the elastically expandable layer of the laminate, the fiber material is manufactured of fiber fleece, fiber mats, or fiber felts.

18. The process of claim 1, wherein the elastically expandable layer of the laminate has a synthetic resin content of 10 to 40% by weight.

19. Process of claim 18, wherein the elastically expandable layer of the laminate has a synthetic resin content of 10 to 28% by weight.

* * * * *